Aug. 16, 1932.  C. E. BLEICHER  1,872,394
PROJECTION WELDING
Filed Nov. 13, 1930

INVENTOR
CLARENCE E. BLEICHER.
BY
ATTORNEY.

Patented Aug. 16, 1932

1,872,394

UNITED STATES PATENT OFFICE

CLARENCE E. BLEICHER, OF DETROIT, MICHIGAN, ASSIGNOR TO CHRYSLER CORPORATION, OF DETROIT, MICHIGAN, A CORPORATION OF DELAWARE

PROJECTION WELDING

Application filed November 13, 1930. Serial No. 495,446.

This invention relates to an improved method of projection welding and to an improved construction of parts that are to be welded.

The main objects of the invention are to provide a method of this kind which is particularly adapted for welding together articles having contacting, concaved and convexed surfaces, respectively; to provide an improved welding method for securing together metal parts which have contacting, concaved and convexed surfaces, respectively that are of substantially the same arcuate curvature and equal in arcuate measurement to substantially 180°; and to provide an improved projection welding method which is particularly adapted for securing spring pads on rear axle housings of motor vehicles.

A further object of the invention is to provide on one of a pair of arcuate shaped members to be welded together, a plurality of projections of different depths which have their outermost extremities lying substantially on an arc that has a curvature identical to the curvature of the other member so as to simultaneously bring all of the projections into contact with the latter member and to obviate excessive rubbing or wiping of some of the projections thereon during the welding operation.

Heretofore in projection welding, it has been customary to provide projections of uniform dimensions, particularly depth, on one of the members being secured together and to place the projections upon the other member while the members are included in an electric circuit. The relatively high current density at the projections and at their contacting areas melts and fuses together some of the metal of each member forming an integral bond between the members. The employment of projections of uniform depths is satisfactory when the contacting surfaces of the members are planular, but when such uniform projections are used in welding together articles having curved contacting surfaces of substantial arcuate dimension, such as articles of semi-cylindrical shape, the outermost projections of one member engage the surfaces of the other member first and as the members are pressed together to bring the remaining projections into contacting relationship, the initially contacted projections rub upon the surface upon which they are received. During this rubbing action and while only the outermost projections are in electric contact with the member to which the projections are being welded, intense heat is applied on the latter member which frequently results in severe scoring thereof as the projections rub upon their receiving surfaces and in some cases a slot is melted completely through the member. In some other instances, the extremity of the projection bearing members are burned away completely by the intense heat which results from the initial contact of the outermost projections.

An illustrative embodiment of the invention is shown in the accompanying drawing, in which.

Figure 1:
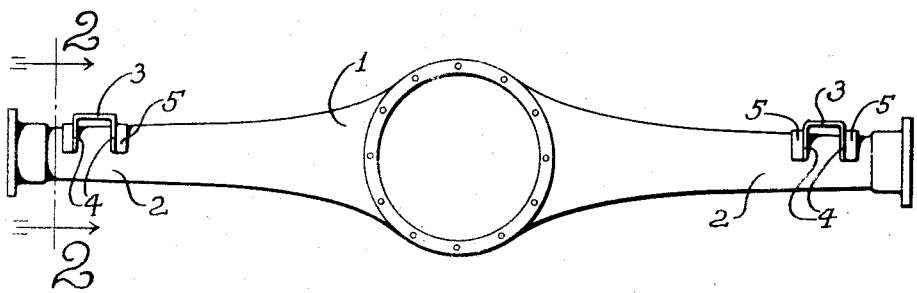
Fig. 1 is a side elevation of an axle housing having a pair of spring pads of the type which it is intended to weld by my improved method.

In the illustration shown, the axle housing and spring pads serve as one example of the type of parts which may be advantageously welded together by my improved welding method. In this example, the axle housing 1 has substantially cylindrical end portions 2 on which are mounted yoke shaped spring pads 3 including an intermediate horizontal section having downwardly extending sides 4 on which are formed substantially semi-cylindrical flanges or seats 5 that are saddled on the outer periphery of the cylindrical end portions 2 of the housing.

Figures 2, 3:
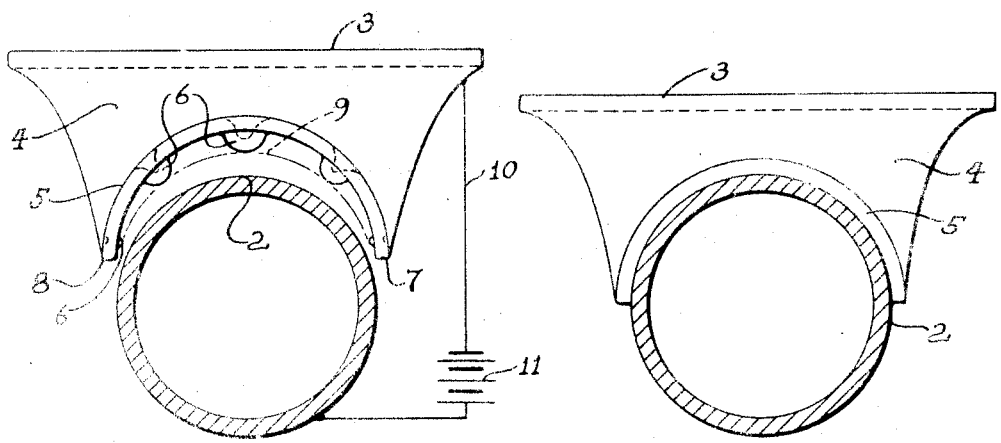
Fig. 2 is a transverse vertical section taken on the line 2—2 of Fig. 1.
Fig. 3 is a transverse section similar to Fig. 2 showing the spring pad in a position in which it is applied under pressure to a substantially cylindrical end portion of the axle housing and illustrating diagrammatically the manner in which electrical energy is supplied to the axle and spring parts for intensely heating the electrical contacting areas thereof.

In mounting spring pads of this kind on axle housings, it is the practice to weld the flanges 5 directly to the axle housing. With my improved welding method, the flanges or seats 5 are provided on their concaved sides with inwardly extending projections 6. These projections may be formed in the flanges 5 by punching or depressing the stock thereof inwardly as illustrated in Fig. 3. The innermost projection 6 which is located substantially midway between the extremities 7 and 8 of the flanges 5 has a maximum depth and the outermost projections 6 located near the extremities 7 and 8 of the flanges 5 have minimum depth, the projection intermediate the innermost and outermost projections having gradually decreasing depths. The varying depths of these projections is such that their extremities lie in an arcuate path, illustrated by the dotted line 9 in Fig. 3, which has a curvature identical to the curvature of the outer periphery of the cylindrical end portion 2 of the axle housing so that when the spring pads are seated upon the cylindrical end portions 2, all of the projections simultaneously engage the outer periphery of the axle housing.

In operation, the spring pad 3 is electrically connected with one terminal of a closed electrical circuit 10 having a source of electrical energy 11 and the axle housing is electrically connected with the other terminal of the circuit. The spring pad is then placed upon the cylindrical end portions 2 of the axle housing so as to bring the projection 6 into electrical contact with the latter. The current which passes through the projections fuses the metal thereof and the metal areas of the axle housing with which the projections contact. All of the projections engage the axle housing at one time, distributing the current intensity somewhat evenly between the projections and as the metal is melted, the spring pad is pressed upon the axle housing, until the concaved surface of the seats 5 thereof engage the outer periphery of the axle housing. The small projection 6 at the outer extremities 7 and 8 of the seats 5 engage the axle housing at a location only slightly in advance of the position to which they are ultimately moved by pressing the spring pad upon the axle housing in the above manner and thus only a slight wiping action occurs between the axle housing and the outermost projections and scoring of the axle housing during the welding operation is materially reduced.

Suitable means, other than an electric circuit, may be used for generating the heat required to fuse the metal, if desired.

Articles other than spring pads and axle housings may be welded together in the above manner and the method is not limited to welding of articles which have contacting surfaces of circular contours. If the contacting surfaces of the articles to be welded have curvatures of any type, the lengths of the projections on one article may be predetermined so as to locate their extremities on a curvature that corresponds with or is substantially identical to the surface of the other article upon which the projections are received during welding.

Although but one specific embodiment of this invention has herein been shown and described, it will be understood that various changes in the size, shape and arrangement of parts may be made without departing from the spirit of my invention and it is not my intention to limit its scope other than by the terms of the appended claims.

What I claim is:

1. The method of welding together members having arcuate contacting surfaces which consists in forming on one of said members a series of projections of varying depths which protrude from the contacting surface of said member and which have extremities lying on an arc having substantially the same curvature as the contacting surface of the other member, connecting each of said members to one terminal of an electric circuit, and pressing said members together with all of said projections of the one member simultaneously engaging a surface of the other member.

2. The method of welding together a pair of members having concave and convexed contacting surfaces respectively which consists in forming a series of spaced protuberances of varying depth on the concaved contacting surface of one of said members having extremities located on a curvature which is substantially identical to the curvature of the convexed contacting surface of the other member, connecting each of said members to one terminal of an electric circuit, and pressing said members together with all of said projections of the one member simultaneously engaging a surface of the other member.

3. The method of welding together a pair of members having concave and convexed contacting surfaces respectively which consists in forming a series of spaced protuberances on the concaved contacting surface of one member which decrease successively in depth from the central portion of said concaved contacting surface to the outer portions thereof and which have extremities located on a curvature which is substantially identical to the curvature of the convexed surface of the other member, placing said members together with all of said projections of the one member contacting with the convexed surface of the other member, and fusing said projections and the areas of the convexed surface with which they contact.

4. The method of welding together a pair of members having concave and convexed contacting surfaces respectively which consists in forming a series of spaced protuberances on the contacting surface of one of said members which decrease successively in depth from the central portion of the latter contacting surface to the outer portions thereof placing said members together with all of said projections on one member in engagement with the contacting surface of the other member, and fusing said projections and the areas of the surface with which they contact.

5. The method of welding a spring pad having a concaved seat on the cylindrical end portion of a rear axle housing which consists in forming a series of inwardly extending projections on the concaved seat of said pad which decrease successively in depths from the central portions of said seat to the outer portions thereof, connecting said pad to one terminal of a closed electric circuit and said axle housing to the other terminal thereof, and pressing said pad upon said axle housing with all the projection initially contacting simultaneously with the outer periphery of the latter.

6. The method of welding a spring pad having a concaved seat on the cylindrical end portion of a rear axle housing which consists in forming a series of inwardly extending projections on the concaved seat of said pad, which decrease in depth successively from the central portion to the outer portions of said pad and which have extremities located on an arc of the same curvature as the cylindrical part of said housing on which said pad is received, connecting said pad to one terminal of a closed electric circuit and said axle housing to the other terminal thereof, and pressing said pad upon said axle housing with all the projections initially contacting simultaneously with the outer periphery of the latter.

7. A spring pad for a rear axle housing including a substantially semi-cylindrical seat part for receiving a cylindrical end portion of an axle housing, and a series of spaced projections decreasing in depth from a maximum depth at the inner central portion of said seat to a minimum depth at the outer extremities of said seat.

8. A spring pad for a rear axle housing including a substantially semi-cylindrical seat part for receiving a cylindrical end portion of an axle housing, and a series of spaced projections extending inwardly from said seat portion, and having their inner extremities located on an arc of the same curvature as that of the cylindrical end portion of the axle housing.

9. A spring pad for a rear axle housing including an arcuate seat portion for securement to an axle housing, and a series of projections extending inwardly from said seat portion decreasing in depth from a maximum depth at the inner central portion of said seat to a minimum depth at the outer portions of said seat and having their inner extremities located in a path having the same curvature as that of the part of said axle housing on which said pad is received.

CLARENCE E. BLEICHER.